(12) United States Patent
Odom (10) Patent No.: US 7,350,078 B1
(45) Date of Patent: Mar. 25, 2008

(54) USER SELECTION OF COMPUTER LOGIN

(76) Inventor: Gary Odom, 123 NW. 12th Ave., #1332, Portland, OR (US) 97209

( * ) Notice: Subject to any disclaimer, the term of this patent is extended or adjusted under 35 U.S.C. 154(b) by 134 days.

(21) Appl. No.: 10/090,520

(22) Filed: Mar. 4, 2002

Related U.S. Application Data (60) Provisional application No. 60/286,457, filed on Apr. 26, 2001.

(51) Int. Cl.
*H04L 9/00* (2006.01)

(52) U.S. Cl. .......................... 713/176; 726/2

(58) Field of Classification Search ............... 713/176, 713/183, 184
See application file for complete search history.

(56) References Cited

U.S. PATENT DOCUMENTS

| | | | | |
|---|---|---|---|---|
| 4,218,738 A | * | 8/1980 | Matyas et al. ............. 705/72 |
| 4,288,659 A | * | 9/1981 | Atalla ..................... 380/281 |
| 4,621,334 A | * | 11/1986 | Garcia .................... 382/115 |
| 4,805,222 A | * | 2/1989 | Young et al. ............. 382/115 |
| 4,962,530 A | * | 10/1990 | Cairns ..................... 713/183 |
| 4,964,163 A | * | 10/1990 | Berry ....................... 713/183 |
| 5,091,939 A | * | 2/1992 | Cole et al. ................ 713/183 |
| 5,161,190 A | * | 11/1992 | Cairns ..................... 713/183 |
| 5,204,966 A | * | 4/1993 | Wittenberg et al. ......... 726/6 |
| 5,226,080 A | * | 7/1993 | Cole et al. ................ 713/183 |
| 5,226,172 A | * | 7/1993 | Seymour et al. .......... 709/222 |
| 5,229,764 A | * | 7/1993 | Matchett et al. ......... 340/5.52 |
| 5,442,342 A | * | 8/1995 | Kung ..................... 340/5.27 |
| 5,491,752 A | * | 2/1996 | Kaufman et al. ........... 380/30 |
| 5,680,462 A | * | 10/1997 | Miller et al. ............. 380/263 |
| 5,682,475 A | * | 10/1997 | Johnson et al. ........... 726/18 |
| 5,696,686 A | * | 12/1997 | Sanka et al. ............. 700/110 |
| 5,721,780 A | * | 2/1998 | Ensor et al. .............. 713/155 |
| 5,768,387 A | * | 6/1998 | Akiyama et al. .......... 713/182 |
| 5,867,647 A | * | 2/1999 | Haigh et al. ............... 726/23 |
| 5,889,866 A | * | 3/1999 | Cyras et al. .............. 713/192 |
| 5,896,497 A | * | 4/1999 | Halstead .................. 726/35 |
| 5,913,024 A | * | 6/1999 | Green et al. ................ 726/3 |
| 6,052,468 A | * | 4/2000 | Hillhouse ................ 380/281 |
| 6,193,153 B1 | * | 2/2001 | Lambert .................. 235/380 |
| 6,205,204 B1 | * | 3/2001 | Morganstein et al. ...... 379/67.1 |
| 6,209,104 B1 | * | 3/2001 | Jalili ....................... 726/18 |
| 6,219,707 B1 | * | 4/2001 | Gooderum et al. ......... 709/225 |
| 6,292,790 B1 | * | 9/2001 | Krahn et al. ............... 705/50 |

(Continued)

FOREIGN PATENT DOCUMENTS

JP      11102345 A  *  4/1999

OTHER PUBLICATIONS

Feldmeier et al., UNIX Password Security—Ten Years Later, 1990, Springer-Verlag, pp. 44-63.*

(Continued)

*Primary Examiner*—Nasser Moazzami
*Assistant Examiner*—David Garcia Cervetti (57) ABSTRACT

Computer login may comprise any user-determined submission. A user may select the input devices used, and which types of signals from input devices are to be used for login authentication. Account identification may be inferred by signature rather than explicitly stated. A plurality of discontiguous data blocks in a plurality of files may be employed for validation. The paths to data used in validation may be multifarious, regardless of the prospects for successful authorization.

23 Claims, 10 Drawing Sheets

U.S. PATENT DOCUMENTS

| | | | |
|---|---|---|---|
| 6,311,272 B1* | 10/2001 | Gressel | 713/186 |
| 6,332,195 B1* | 12/2001 | Green et al. | 726/14 |
| 6,363,153 B1* | 3/2002 | Parker et al. | 380/263 |
| 6,421,453 B1* | 7/2002 | Kanevsky et al. | 382/115 |
| 6,442,692 B1* | 8/2002 | Zilberman | 713/184 |
| 6,466,781 B1* | 10/2002 | Bromba et al. | 455/411 |
| 6,618,806 B1* | 9/2003 | Brown et al. | 713/186 |
| 6,636,975 B1* | 10/2003 | Khidekel et al. | 726/10 |
| 6,647,400 B1* | 11/2003 | Moran | 707/205 |
| 6,647,498 B1* | 11/2003 | Cho | 726/17 |
| 6,651,168 B1* | 11/2003 | Kao et al. | 713/185 |
| 6,657,614 B1* | 12/2003 | Ito et al. | 345/168 |
| 6,751,734 B1* | 6/2004 | Uchida | 713/186 |
| 6,766,456 B1* | 7/2004 | McKeeth | 726/2 |
| 6,948,154 B1* | 9/2005 | Rothermel et al. | 717/128 |
| 6,957,337 B1* | 10/2005 | Chainer et al. | 713/186 |
| 2001/0047488 A1* | 11/2001 | Verplaetse et al. | 713/202 |
| 2002/0002678 A1* | 1/2002 | Chow et al. | 713/169 |
| 2002/0002685 A1* | 1/2002 | Shim | 713/200 |
| 2002/0083339 A1* | 6/2002 | Blumenau et al. | 713/201 |
| 2002/0087894 A1* | 7/2002 | Foley et al. | 713/202 |
| 2002/0091937 A1* | 7/2002 | Ortiz | 713/200 |
| 2002/0141586 A1* | 10/2002 | Margalit et al. | 380/270 |
| 2003/0056120 A1* | 3/2003 | Liu et al. | 713/202 |
| 2004/0128508 A1* | 7/2004 | Wheeler et al. | 713/170 |
| 2006/0036547 A1* | 2/2006 | Yasuhara | 705/44 |

OTHER PUBLICATIONS

Syukri et al., A User Identification System Using Signature Written with Mouse, 1998, Springer-Verlag, pp. 403-414.*

Harn et al., Integration of User Authentication and Access Control, 1992, IEEE, vol. 139, No. 2, pp. 139-143.*

Monrose et al., Password Hardening Based on Keystroke Dynamics, 1999, ACM, pp. 73-82.*

* cited by examiner

USER SELECTION OF COMPUTER LOGIN

CROSS REFERENCE TO RELATED APPLICATIONS

This application claims priority from provisional application 60/286,457, filed on Apr. 26, 2001.

BACKGROUND

Computer login traditionally consists of a user typing in an account name and a password.

Historically, access validation, such as authenticating a password for an account, has been through reading data from a single password file comprising account name and encrypted password. Once a single account and a typed password is known, system security can be compromised. Once encryption for a single password is broken, all other passwords are potentially comprised, as all passwords and account names are conveniently located in the single password file and use the same encryption.

U.S. Pat. No. 6,442,692 [Zilberman] disclosed a special microcontroller embedded within a keyboard. The microcontroller was employed "to measure certain characteristics of the user's keystroke dynamics" independent of the typed text, including the timing, intervals, and durations of key presses and pauses. These measured characteristics were then used as integral information for authenticating a user's identity.

U.S. Pat. No. 6,766,456 [McKeeth] disclosed user input from one or a combination of input devices as a basis for user authentication. McKeeth used matching of "implicit input" as part of the authentication, where the implicit input is related to the timing and/or duration of explicit inputs.

Zilberman and McKeeth used surreptitious surveillance of user input, where the user could not choose or control data vital to authentication. McKeeth disclosed the possible usage of multiple input devices, used singularly or in combination, but only disclosed that "the computer system may be configured," never anticipating that a user may choose the input device configuration.

SUMMARY

Computer login may comprise any user-determined submission, including a plurality of transmissions for which submission may be passively terminated. Preferably a user determines the signal types as well as content of signals. This makes submission theft more difficult and less likely.

Account identification may be inferred by signature rather than explicitly stated. Overt account identification provides an entry point for hacking; with inferred account identification, this entry point is eliminated.

A plurality of discontiguous data blocks (keys) in a one or more files may be employed for validation. This ameliorates having a single authentication key that, once accessed, may be deciphered and security compromised.

Multiple trajectories to keys, hence multiple paths to authorization as well as ersatz trajectories and paths when submission will not garner authorized access, obfuscate validation protocol to spy software and devices.

These aspects are independent: one does not rely upon the other. Any one or all may be employed to enhance computer login security.

Access privileges for accounts are not germane. Determining or setting account access privileges are separate operations that occur after submission validation and authorization.

DESCRIPTION

Figure 1:
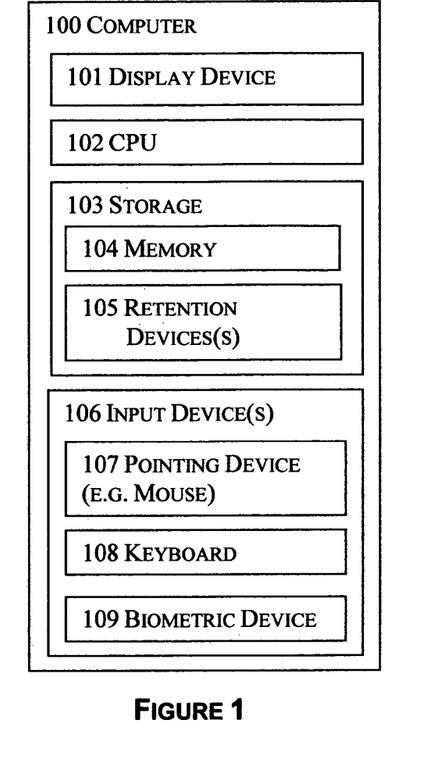
FIG. 1 is a block diagram of a computer suitable for practicing the invention.

FIG. 1 is a block diagram of a desktop computer 100 which comprises a CPU 102; storage 103, which comprises memory 104 and optionally one or more devices with retention medium(s) 105 such as hard disks, diskettes, compact disks, or tape; an optional display device 101; and one or more input devices 106, examples of which include but are not exclusive to: a keyboard 108; one or more pointing devices 107, such as a mouse; or a biometric device 109, such as a fingerprint reader. The mouse is the most popular pointing device 107 for desktop computers 100. In the description below, mention of a mouse is meant to include pointing devices 107 of any type, including, for example, a pen or stylus used in computing devices where a user may "write" upon a screen. The described software may be employed on such a computer 100. As well, the software described may find application in other computer-like devices requiring secured access, including hand-held or embedded devices.

In the following description, software-determined protocol includes exemplary methods or techniques such as algorithms; or non-algorithmic methods or techniques, including, for example, fuzzy logic or neural network pattern matching; or, random or pseudo-random determinations. A random or pseudo-random technique that results in seemingly arbitrary selection, the equivalent of software rolling dice, is referred to as non-deterministic.

In the following description, protocols, algorithm types, data types, and types of data, such as transmission 11, signal 21, packaging 13, sequencing 15, or encryption 14 types or protocols, are identifiable using binary identification codes (type identifiers), by data length, or other data signature, such as a uniquely identifiable bit pattern, or by convention, such as known location (offset) within a data structure.

Figure 2:
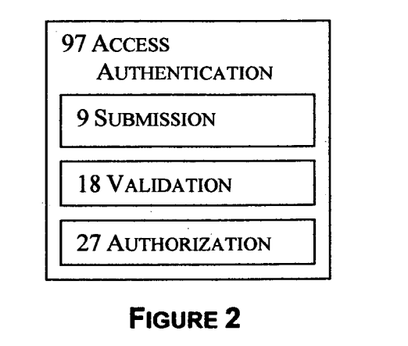
FIG. 2 depicts the access authentication process.

FIG. 2 depicts the access authentication process 97, comprising submission 9, validation 18, and authorization 27. Naturally, an account must be created 10 before any access authentication process 97 may occur.

Figure 3:
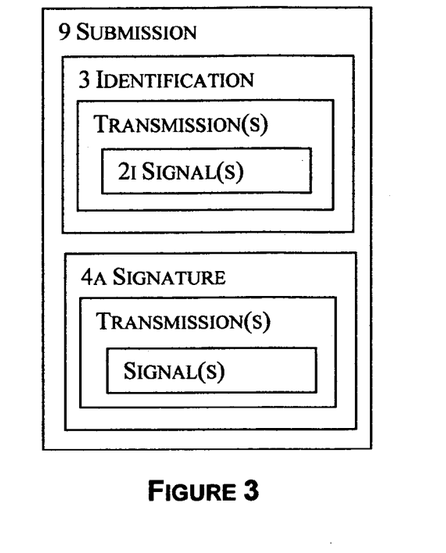
FIG. 3 depicts an embodiment of identification and signature comprising submission.
Figure 4:
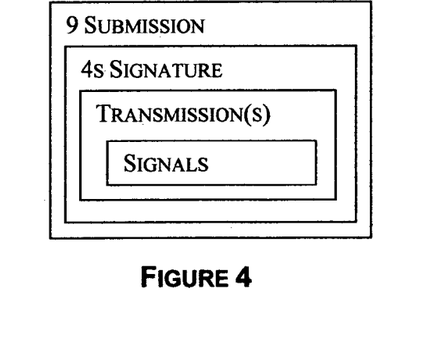
FIG. 4 depicts an embodiment of signature solely comprising submission.

Submission 9 comprises one or more transmissions 1 intended for authenticating access to a computer 100 or network of computers 100. As depicted in FIG. 3, in one embodiment, a submission 9 comprises identification 3 and signature 4. Historically, an account name would be an identification 3, and a password a signature 4. If surety of uniqueness may be assured, in an alternate embodiment, a submission 9 comprises a single signature 4s, as depicted in FIG. 4, supplanting separate identification 3 & signature 4a while providing for the dual components of identification 3 and signature 4. With submission 9 solely comprising signature 4s, an account may be identified by the signature 4s data itself, or by having an account identifier 110 embedded within a key 6 that has been accessed during validation 18 of the signature 4s.

A transmission 1 is user input into the computer 100 via one or more input devices 106, whereupon termination of transmission 1 is recognizable, and resulting in at least one signal 2. There may be different types 11 of transmissions 1, examples of which include mouse 107 movements or clicks, keyboard 108 entry, or combinations thereof. Other types 11 of transmissions 1 are possible with different input devices 106, such as, for example, voice transmission 1 if the computer 100 is equipped with a microphone and speakers.

Figure 6:
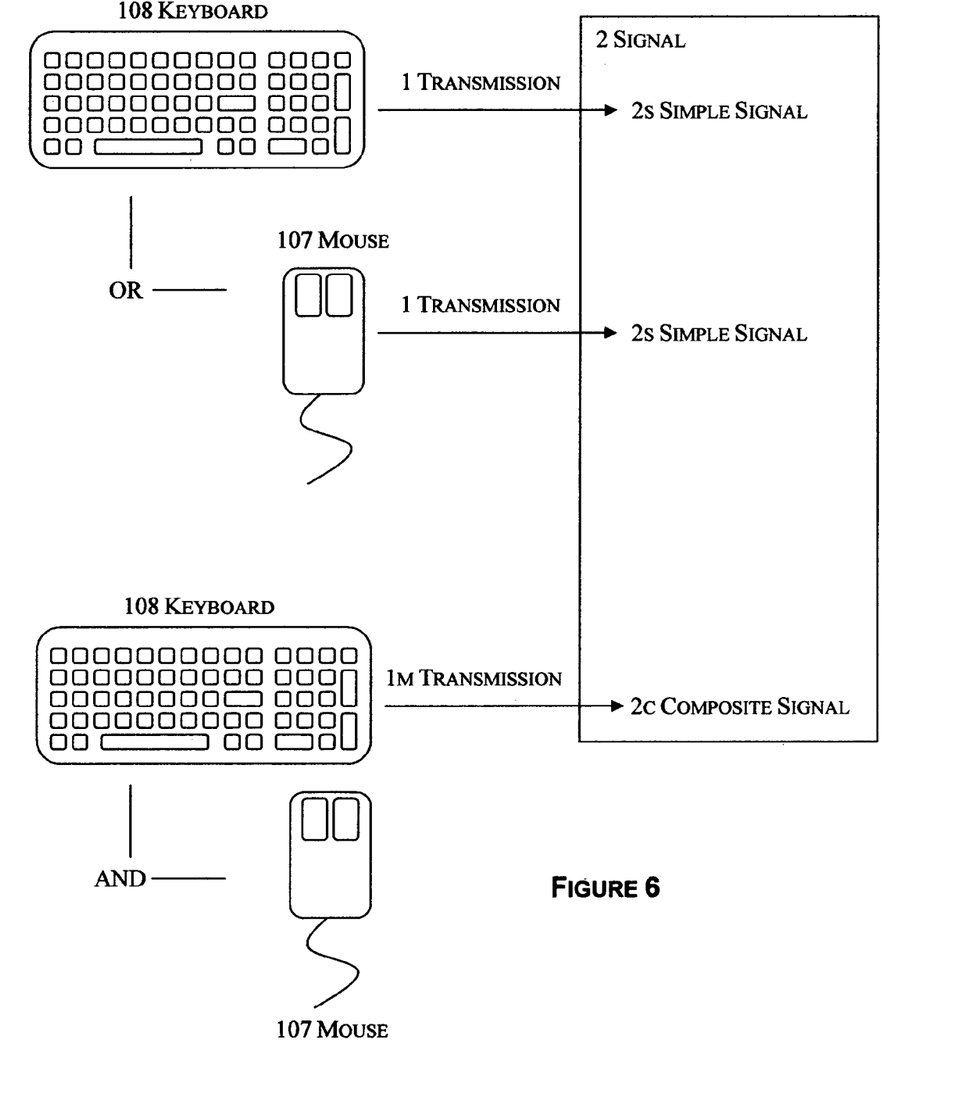
FIG. 6 depicts simple and composite signals.

Multiple-device 106 transmission 1m is conceivable. An example of a multiple-device 106 transmission 1 is a combination of mouse 107 movement while one or more keys 108 are pressed, as depicted in FIG. 6.

A signal 2 is a set of related software-recognizable data from a single transmission 1. A plurality of signals 2 of different types 21 may emanate from a single transmission 1. For example, typing a word may yield the signals 2 of entered keys 210 and the timing between keystrokes 211. Another example: mouse 107 movement of the cursor may yield signals 2 of locations 214, velocities, duration; and shape pattern(s) (such as script signatures, drawn characters, and so on) 215.

A transmission 1 of composite signals 2c comprising a plurality of simple signals 2s is conceivable. For example, a multiple-device 106 transmission 1m produces a composite signal 2c if matching to signals 2 of both devices 106 is required, as does requiring signal match 5 of multiple signal types 21 from a single-device transmission 1.

Figure 5:
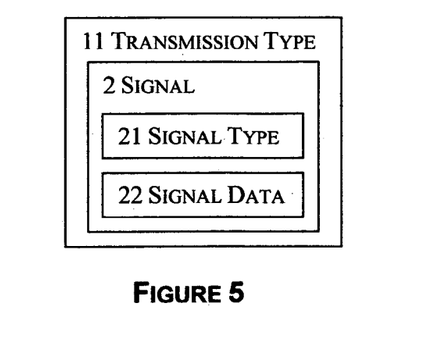
FIG. 5 depicts classifying signals by their transmission and signal types.

Signal data 22 may be categorized by its transmission type 11 and/or signal type 21, as depicted in FIG. 5. For easy identification, each possible transmission type 11 or signal type 21 may be assigned a unique ordinal. Hypothetically, if a multiple-device 106 transmission 1 is identified as a unique transmission type 11, the range of transmission types 11 may extend to the factorial of all possible input devices 106, depending upon the embodiment employed. To avoid unnecessary complication, consider signal type 21 as potentially additive (rather than combinatorial): for example, a key-mouse transmission 1 could be considered as comprising key 108 plus mouse 107 signals 2, rather than some uniquely identifiable key-mouse signal type 21.

Identification 3 is at least one transmission 1 of an account identifier. Historically, identification 3 has been a keyed-in account name. Employing the invention, identification 3 comprises at least one signal 2 from at least one transmission 1. A translation table, algorithmic method, or other software-determined protocol, with or without encryption 14, may be employed if identification 3 or signature 4s does not represent the actual account identifier.

A signature 4 is at least one transmission 1 intended as a security precaution to preclude unauthorized access 39. Historically, a single signal 2 of a single transmission 1 has typically been used for a signature 4, namely a password, which is a signature 4 of a single word of text. A pass-phrase is a signature 4 of a plurality of words of text.

A plurality of transmissions 1 or signals 2 may be used for identification 3 or signature 4. In some embodiments, a user may determine the transmission(s) 1, signal(s) 2, transmission type(s) 11, or signal type(s) 21 that comprise a submission 9. Alternately, transmission 1 or signal 2 determination accords with a software-determined protocol.

Historically, validation 18 has required an absolute signal match 5 to input 22: for example, no deviance from a character-based password has been permitted. With mouse 107 movements, or other difficult-to-exactly-replicate signals 2, however, some tolerance may be permitted. Signal 22 tolerance should be allowed when appropriate, and may be set by software-determined protocol or user selection. For example, deviance up to 10% from recorded signal match 5 for keystroke timing 211 may be acceptable. Similarly, as another example, mouse click location may vary within a radius of 10 pixels and still be tolerated. As multiple signals 2 may comprise a submission 9, the need for exactness for any single signal 2 to properly authenticate access 97 is lessened.

Figure 7:
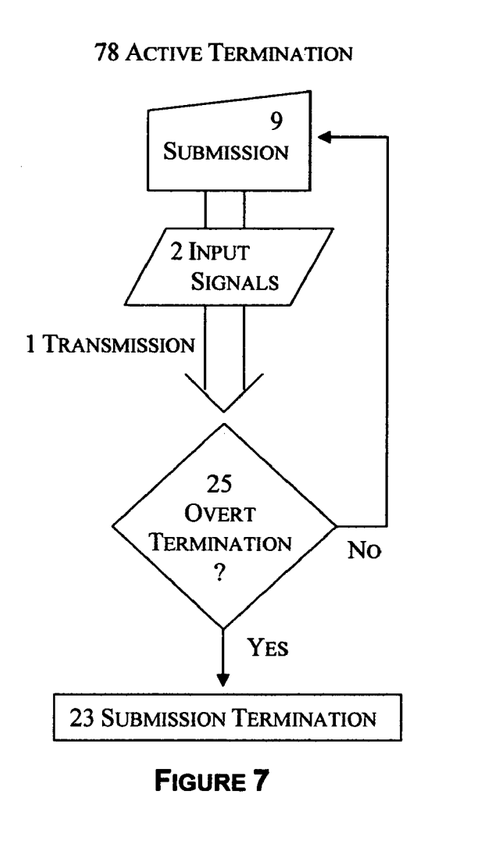
FIG. 7 depicts active submission termination.
Figure 8:
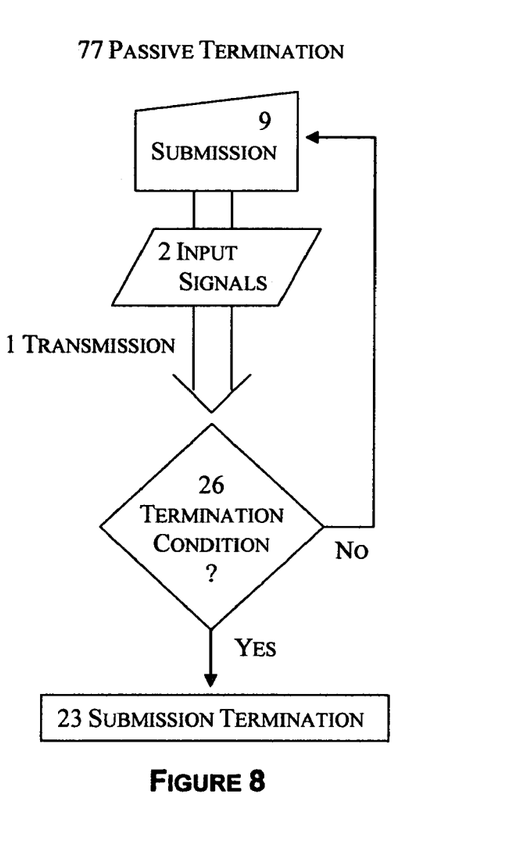
FIG. 8 depicts passive submission termination.

Termination of submission 9 may be active or passive. FIGS. 7 & 8 illustrate. Inputting a password or pass-phrase, for example, is typically terminated by pressing the 'Enter' key or clicking an equivalent acknowledge button 43 using the mouse 107. As another example, inputting mouse 107 movement may be actively terminated by a mouse 107 click. With active termination 78, a user terminates submission 9 through a prescribed indication 25. With passive termination 77, software terminates submission 9 without overt user action, but instead when a predetermined condition is met 26. Examples of passive termination 77 include: recording mouse 107 movement or sound for a limited time, or until a certain elapsed time absent further input; until sufficient signal 2 has been input to allow a signal match 5; or until a succeeding transmission 1 of another transmission type 11 or signal type 21 commences, the change of type 11 itself indicative of previous transmission 1 termination. For example, changing from cursor/mouse movement to mouse button clicking may be considered a change in signal type 21, and hence a possible basis for passive termination. Biometric transmission 1 is typically passively terminated 77: software terminates submission 9 when sufficient biometric signals 2 have been recorded.

Termination 23 of identification 3 or signature 4 may occur using any number of protocols: passively 77 by a predetermined or user-selected number of transmissions 1; final transmission 1 by a particular type of action; active termination 78 by a final gesture, such a key or button press; passive termination 77 by time out of a predetermined duration or sufficiency of data collection. Another example: incremental validation 181 permits passive termination 77 via absence of next key trajectory 7, or, alternately, completed signal matching 5 of all relevant keys 6.

Figure 9:
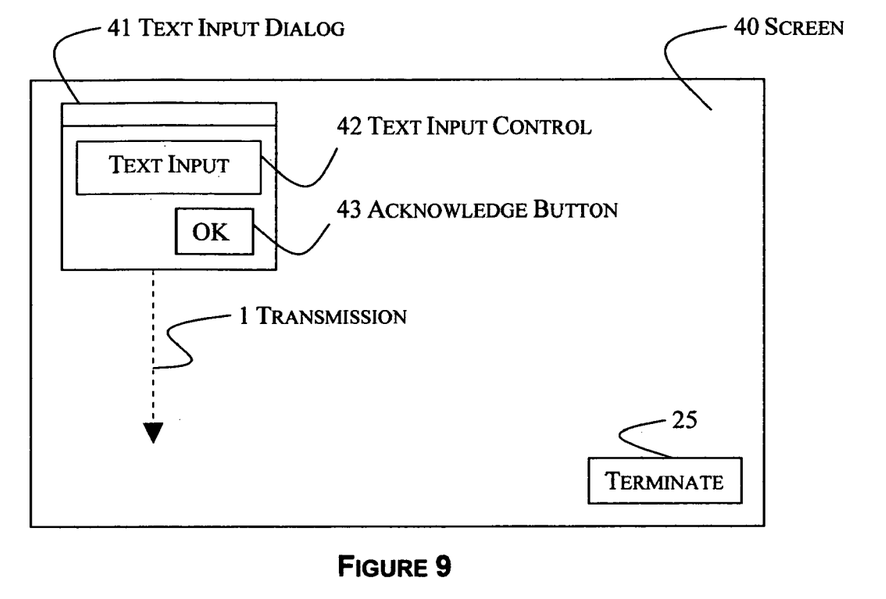
FIGS. 9 & 10 depict example submission screens.
Figure 10:
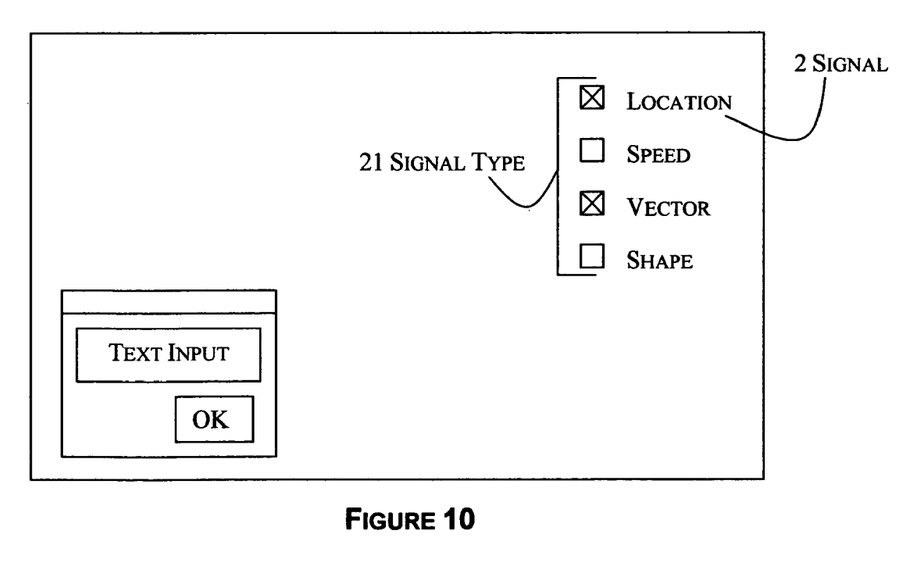

FIGS. 9 & 10 depict an example account input 99 or post-account creation submission 9 screen 40, employed to input at least a signature 4. (In one embodiment, account identifiers 3 may be assigned.) Text transmission(s) 1 can be input in the text input dialog 41 comprising a text input control 42 and acknowledge button 43. Signature 4 transmission(s) 1 can be input, and input signals 2 recorded. FIG. 9 depicts dragging the text input dialog 41 down the screen 40 as a transmission 1 (by pressing the proper mouse 107 button when the cursor is over an appropriate section of dialog 41, thus selecting the dialog 41, then moving the mouse 107 while keeping the button pressed). The dragging action in this example is terminated by a mouse-up (releasing the mouse 107 button).

In one embodiment, a user may determine as part of account creation 10 which signal types 21 are to be considered for validation 18 of subsequent submissions 9. This is an editing process that may be construed as part of account input 99. For example, after submission termination 23, having recorded signals 2 for account input 99, as depicted in the example of FIG. 10, the user may select, via checkbox controls as shown, which signal types 21 of the transmission 1 depicted in FIG. 9 are to be considered for the transmission 1 being recorded. The checkboxes are specific to types of signals 21 appropriate to the type of transmission 11 employed. In the described example, the checkboxes (for signal type 21 selection) appear only for account input 99, not when a user is making an submission 9 after an account has been created, as the prerequisite signals 2 for signature 4 or identification 3 have already been stored.

FIG. 9 depicts a button 25 for submission termination 78. A termination button 25 or its equivalent is necessary only with active termination 78. Initial input for account creation 10 may use active termination 78 which is later edited out during a subsequent signal 2 and transmission 1 selection process, resulting in passive termination 77.

There is an embodiment whereby a user may determine some or all of the transmissions 1 or transmission types 11 comprising account input 99. There is an embodiment whereby a user may determine which signal types 21 of select transmissions 1 comprise account input 99. Otherwise, software-determined protocol may determine all or some transmissions 1 or signals 2 comprising account input 99.

In one embodiment, account input 99 captures all transmission 1 signals 2 until actively terminated 78. In an alternate embodiment, account input 99 may be passively terminated 77. In one embodiment, transmissions 1 and signals 2 from account input 99 may be edited, the user selecting signals 2 and termination, such that only select, edited signals 2 and termination types are employed as account submission 9. In alternate embodiments, as aspects of account input 99, signals 2 may not be edited or user-selected, or termination 23 type user-determined.

Figure 11:
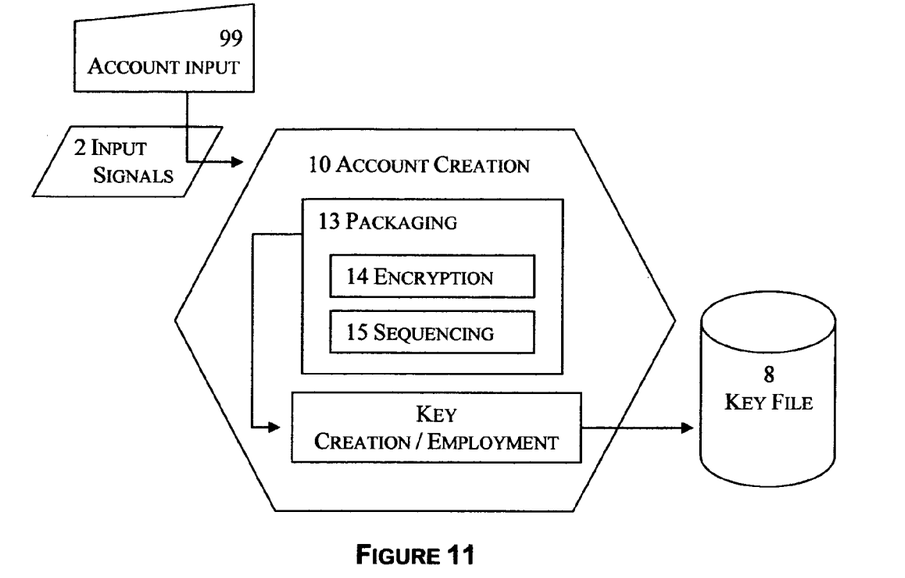
FIG. 11 depicts account creation.

FIG. 11 depicts account creation 10, in the beginning of which account input 99 provides one or more signals 2 from one or more transmissions 1 for packaging into one or more keys 6. Each user account has at least one key 6 for access authentication 97.

There are two aspects to account creation 10: packaging 13, and key 6 creation or employment 16.

Packaging 13 tells how to interpret keys 6, including stored match signals 5. Overt packaging 13 is optional, and may vary by embodiment. Packaging 13 may be implicit by software-determined protocol, obviating the need for overt, data-based packaging 13. There may be two optional aspects to packaging 13: encryption 14 and signal sequencing 15.

Encryption 14 refers to encrypting or decrypting all or part of key 6 data. Encryption 14 is optional, but recommended. Encryption 14 employment may vary by embodiment. In one embodiment, the same encryption 14 protocol or algorithm is used throughout (thus, predetermined). In alternative embodiments, encryption 14 may vary by software-determined protocol or by user selection on a per-user or per-signal 2 basis. If a plurality of protocols are used for encryption 14, the protocol 14 employed must be identifiable.

As a suggestion for encryption 14, initial input signals 2 in the first transmission 1 may comprise a parametric seed for encrypting one or more keys 6. Caution is advised if non-exact signal matching 5 is tolerated, as close may not good be enough for decryption using such a seed technique, but it is possible to incorporate tolerance into an encryption 14 algorithm, so that an acceptable margin of error for signal matching 5 may also suffice for decryption as well. Mathematical rounding is a suggested technique allowing such tolerance; as well employing a subset of possible signals 2, such as a high and low, or using one or more algorithmically-derived values, such as median or mean.

Signal sequencing 15 is codification of the order of signals 2. Signal sequencing 15 may be predetermined (software-determined), such as, for example, input order, or, alternately, a predetermined prioritization. In alternative embodiments, signal sequencing 15 may vary by software-determined protocol or by user selection. If a plurality of protocols are used for signal sequencing 15, the protocol employed must be identifiable.

Sequencing 15 and encryption 14 may be combined, offering further opportunity for obscuring decipherment of packaging 13 protocols.

During account creation 10, each selected signal 2 is optionally encrypted 14, encoded for subsequent signal matching 5, and stored in keys 6, which are stored in key files 8, for subsequent access authentications 97.

As in the prior art, each account must be unique. For accounts where submission 9 comprises identification 3 and signature 4a, identification 3 must be unique. For accounts where submission 9 comprises signature 4s, the signature 4s itself must be unique. During account creation 10, this can be verified by attempting to validate 18 the appropriate component of a submission 9 for a new account prior to establishing the account 10.

A key 6 may contain account identification 3.

As depicted in FIG. 11, a key unit 16 is a virtual or actual collection of signal matches 5. As in one embodiment a single key 6 may have a plurality of signal matches 5, and thereby function as a plurality of keys 5 in alternate embodiments, a key 6 may comprise a key unit 16. A key file 8 as an actual or potential collection of keys 6 a key unit 8. An established account may be considered a virtual aggregation of the keys 6 used to validate 18 submission 9 for that account, hence also represents a key unit 16.

A key file 8 comprises at least one key 6. A key file 8 may comprise a plurality of keys 6, or what deceptively may be keys 6: a key file 8 may have pseudo-keys as key file 8 filler. In one embodiment, key files 8 may be a uniform number of bytes, regardless of the number of keys 6 stored in a key file 8. Keys 6 may be in files 8 not exclusively comprising keys 6 (or pseudo-keys); in other words, a key file 8 may as well be employed for other purposes, including files 8 comprising unrelated data or even executable code.

Figure 12:
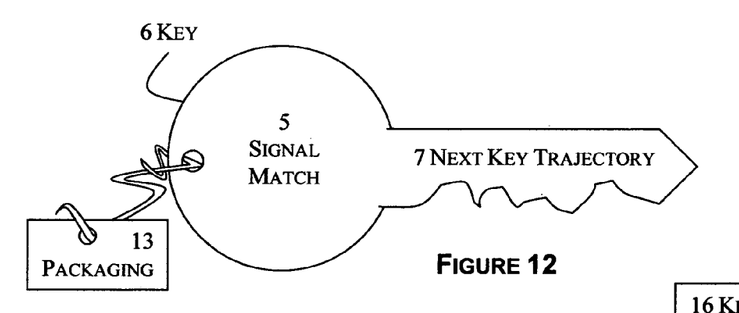
FIG. 12 depicts a key.
Figure 13:
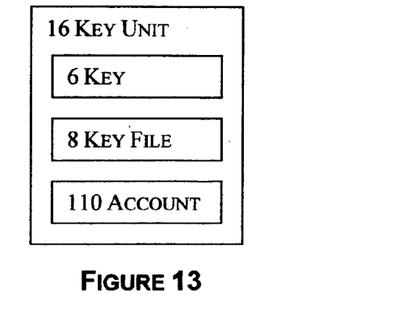
FIG. 13 depicts a key unit.

As depicted in FIG. 12, a key 6 may comprise packaging 13, at least one signal match 5 facility, and at least one next key trajectory 7. In alternate embodiments, key 6 composition varies; the minimum requirement is that a key 6 comprises at least one signal match 5. Packaging 13 and next key trajectory 7 inherency may vary.

A signal match 5 is a signal 2 stored in a key 6 during account creation 10, used for validation 18 of a subsequent submission 9 signal 2. A key 6 may comprise a plurality of signal matches 5.

A next key trajectory 7 vectors validation 18 to the next key 6, or, if the terminal key 6t, results in forwarding match results 33 for authorization 27, by absence of next key trajectory 7 in one embodiment. Next key trajectories 7 are a sequential organizational facility for keys 6.

Next key trajectories 7 may be obviated by having a single key 6 with sufficient contiguous signal matches 5 for validation 18, whereupon the signal matches 5 within the key 6 are sequenced, organized, indexed, or otherwise knowable by software-determined protocol in relation to packaging 13.

As the correspondence of signal match 5 to key 6 varies by embodiment, so too where a next key trajectory 7 leads. Depending upon restrictions that may be imposed in an embodiment, a next key trajectory 7 may lead to a key 6 in the same key file 8 as the last key 6, a key 6 in another key file 8, or the same key 6 if the key 6 holds a plurality of signal matches 5.

Next key trajectory 7 provides all or part of a reference to the next key 6 used in validation 18, if there is a next key 6. A next key trajectory 7 may be encrypted 14.

A next key trajectory 7 may be combined with other data that may have been or need to be mathematically transposed to determine the next key 6. For example, all or a portion of an account identifier 3, part of a signal match 5, or some portion of packaging 13 may be combined with the next key trajectory 7 as a next key 6 identifier. Next key trajectory 7 may comprise or reference an offset in a key file 8. A next key trajectory 7 may reference a key index entry 62.

A key 6 may include a plurality of next key trajectories 7, in which case a different next key trajectory 7 may be selected based upon signal match 5 results—one or more next key trajectories 7 for a correct signal match 5, likewise for an wrong signal match 5. With a plurality of next key trajectories 7, a next key trajectory 7 may be selected based upon signal match 5 results, or by software-determined protocol, or a combination thereof.

Packaging 15 may be encoded as part of the next key trajectory 7. For example, a next key trajectory 7 may include the signal sequencing 15 that identifies next signal match 5 type 21. In this instance, if the next input signal 2 cannot be of the same type 21 as the next signal match 5, authorization 27 may fail 86. Knowing that at that point, a wrong trajectory protocol 7w may be invoked to avoid identifying a proper key unit 16.

A submission 9 comprising identification 3 followed by signature 4a is easier to validate 18 than a submission 9 solely comprising signature 4s: knowing an account identifier 3 provides the means to know what the signature 4a should be.

Historically, identification 3 has not been relied upon for security. Signature 4 has played gate-keeper to unauthorized access 39, not account identification 3.

An initial key 61 that may ultimately lead to authorized 27 access 39 must associate to an account, either directly or by reference. There may be keys 6 for which authorization 27 cannot succeed 86 that may not associate to an account for which access 39 may be obtained. A key unit 16 for which authorized 27 access 39 is unobtainable is referred to as a fake key 6w.

Organize key units 16 as an optmization. Various conventions of organizing or indexing accounts, keys 6, and key files 8 may be employed. In alternate embodiments, the same organizing principles may be applied at the level of key 6, key file 8, or account.

Optimally, keys 6 are organized to facilitate rapid search for signal matches 5, particularly for finding initial signals 21 when submission 9 solely comprises signature 4s. Keys 6 may be sorted. For example, keys 6 for initial signals 21 may be arranged in binary sorted order by signal type 21 and signal 2.

Key files 8 may be organized by account, or by transmission type 11. Key files 8 may be organized by signal type 21, with keys 6 within files 8 organized by input ordinal.

Alternately, an initial key file 81 may comprise all possible initial keys 61 (of first signal matches 5), possibly organized or indexed by signal type 21. One or more key files 8 may contain one or more indexes 61 to keys 6 within their respective files 8.

A key file 8 may include an index 61, or key files 8 themselves be indexed. The next key trajectory 7 may provide next key 6 lookup via an index 61. A key file 8 may include an index 611 to initial signal keys 61. The index 61 may comprise key trajectories 7, including key trajectories 7 to possible first keys 61, which may be organized by transmission type 11 and/or signal type 21.

Figure 14:
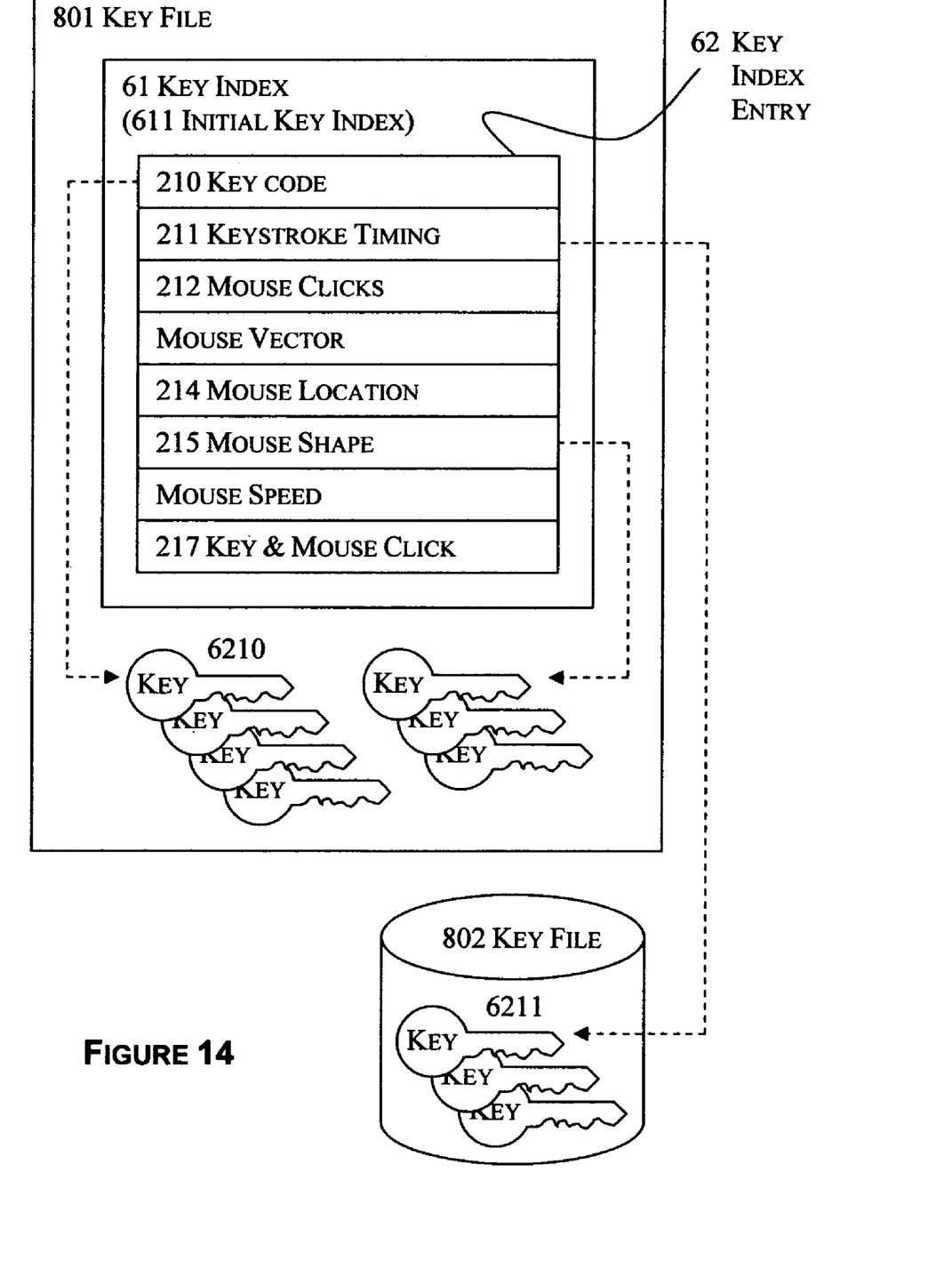
FIG. 14 depicts an example of key indexing.

FIG. 14 depicts an example of key 6 indexing. Key 6 indexing 61 or organization is recommended when submission solely comprises signature 4s where a user may input signals 2 in any user-determined manner. Depicted in FIG. 14 is a key file 801 with a key index 61, specifically an initial key index 611. The depicted initial key index 611 contains references to keys 61 that contain at least initial signals 2.

In the FIG. 14 example, only initial keys 61 are indexed. In this example, checking possible initial keys 61 constitutes initial key trajectory 71. One or more next key trajectories 7 in an initial key 61 may indicate keys 8 for succeeding signal matching 5, like links in a chain, so only an index of initial keys 61 is required. Alternately, a single key 6 may contain all necessary signal matches 5 for validation 18.

A key index 61 may reference keys 6 in different files 8. As depicted in the FIG. 14 example, initial key index 611 entries 62 reference keys 6 of the same input signal type 21. Initial key code keys 210, for example, reference keys 6210 in the same file 801 as the index 611, while keystroke timing keys 6211 referenced by the keystroke timing index entry 211 reside in another key file 802. Key indexing 61 is an optimization.

A key code & mouse click key index entry 217 is depicted in FIG. 14 as an example of a composite signal 2. The key code & mouse click key index entry 217 may reference keys 6 comprising multiple signal matches 5, one for each simple signal 2 (key code 210 and mouse click 212), or, alternately, reference multiple keys 6, each with simple signal matches 5 that altogether comprise the composite signal 2.

Without key file 8 organization or key indexing 61, more keys 6 may need to be considered than just those keys 61 for initial signal matches 5. With next key trajectories 7 referring to subsequent keys 6, optimally, only potential initial keys 61 need be searched to commence validation 18.

Figure 15:
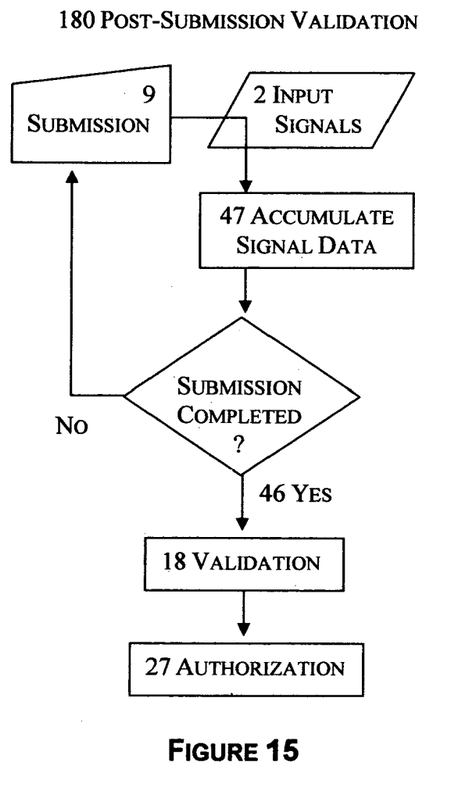
FIG. 15 depicts validation after submission termination.
Figure 16:
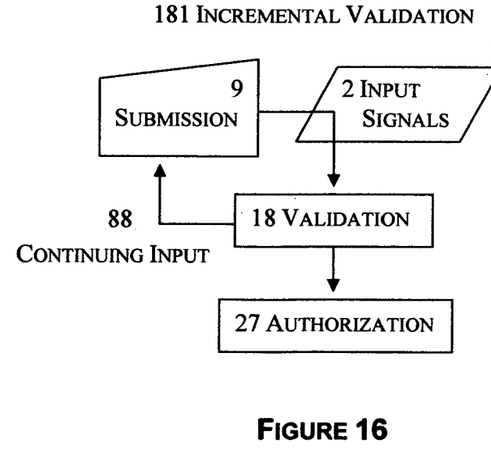
FIG. 16 depicts incremental validation.

FIG. 15 depicts post-submission validation 180: input signals 2 are accumulated 47 and submission 9 completed 46 before validation 18 commences. FIG. 16 depicts incremental validation 181: validation 18 is concurrent with submission 9 transmission 1. In other words, with incremental validation 181, validation 18 may progress with each signal 2 or transmission 1.

Submission termination 23 must be known using post-submission validation 180. This is a potential drawback: unless software-determined protocol determines submission termination 23, passive termination 77 cannot be accomplished using post-submission validation 180; active termination 78 must be used. For full user-determined submission 9, employ incremental validation 181, which has the concomitant advantage of immediate knowledge of authorization failure 86, allowing wrong key trajectory 7w protocol interposing.

Figure 17:
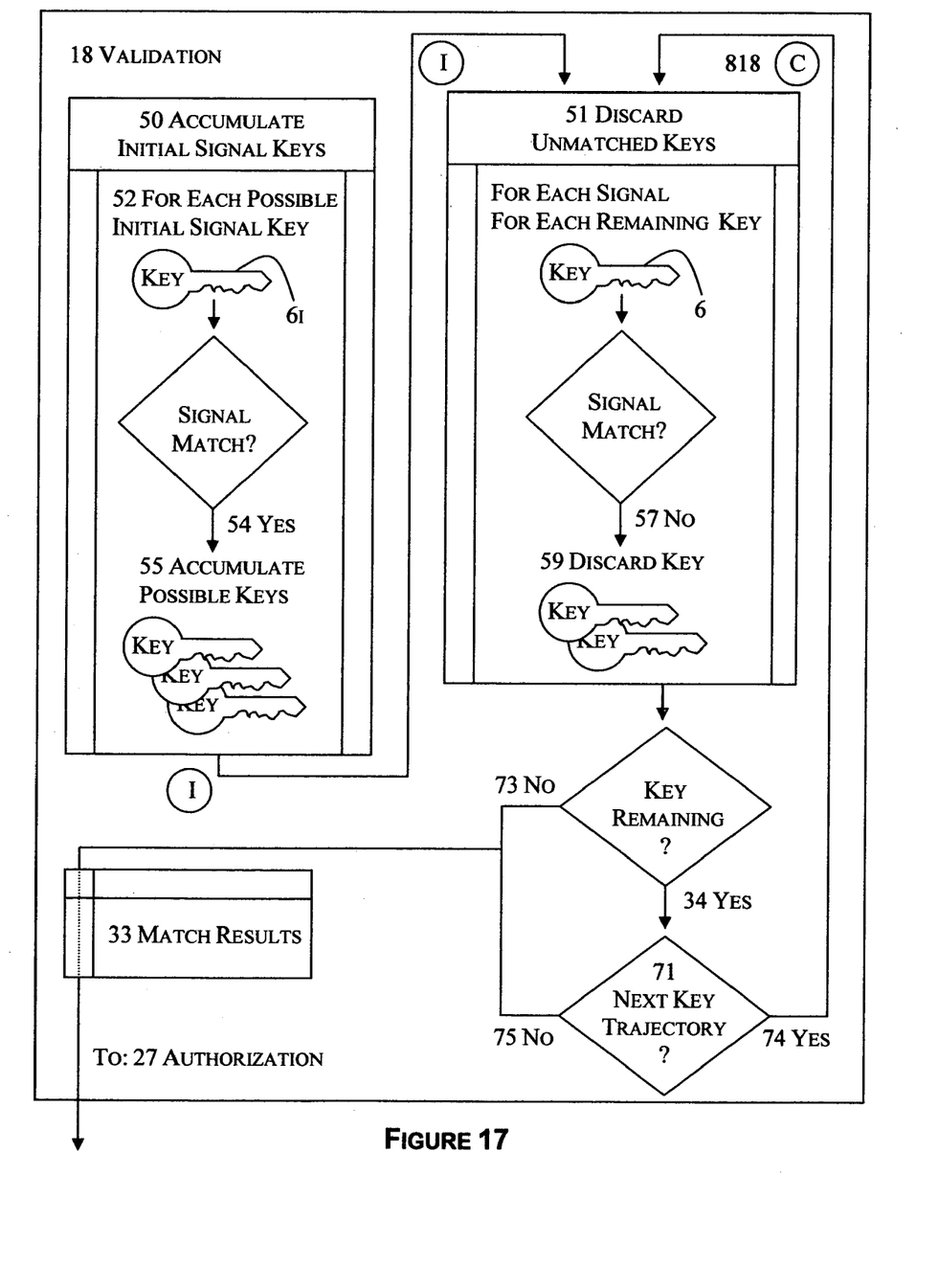
FIG. 17 depicts the validation process.

FIG. 17 depicts the validation 18 process, which is similar regardless whether post-submission validation 180 or incremental validation 181 is employed.

Incremental validation 181 may commence once the first transmission 1 completes, or, in a more sophisticated embodiment, ongoing 88 with signal input 2. In a concurrent validation 181 embodiment, initial signal keys may be accumulated 50 and subsequent unmatched keys discarded 51 concurrent with transmission 1, on a signal-by-signal 2 basis.

Validation 18 commences by accumulating possible keys 55 based upon signal match 54 between signals 2 of the first transmission 1 and possible initial signal keys 52. For subsequent transmissions 1, accumulated keys are discarded 59 by failure to match signals 57. Match results 33 are passed to authorization 27 when there are no keys remaining 73 or no next key trajectories 7 for remaining keys 75. As long as there are remaining keys 34 with next key trajectories 74, the process of discarding keys that don't match 51 continues 818.

Figure 18:
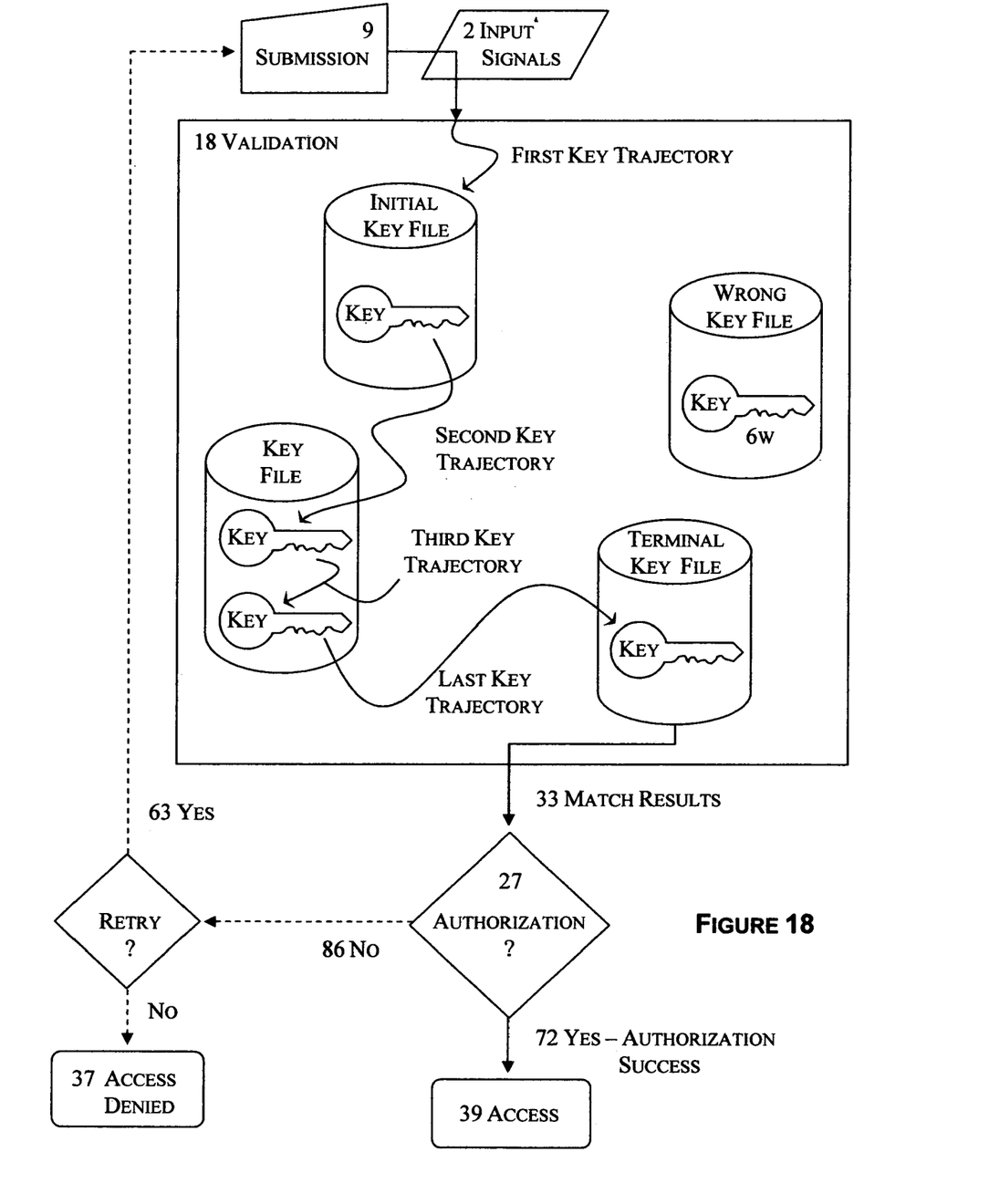
FIG. 18 depicts an example of validation key trajectory resulting in access.
Figure 19:
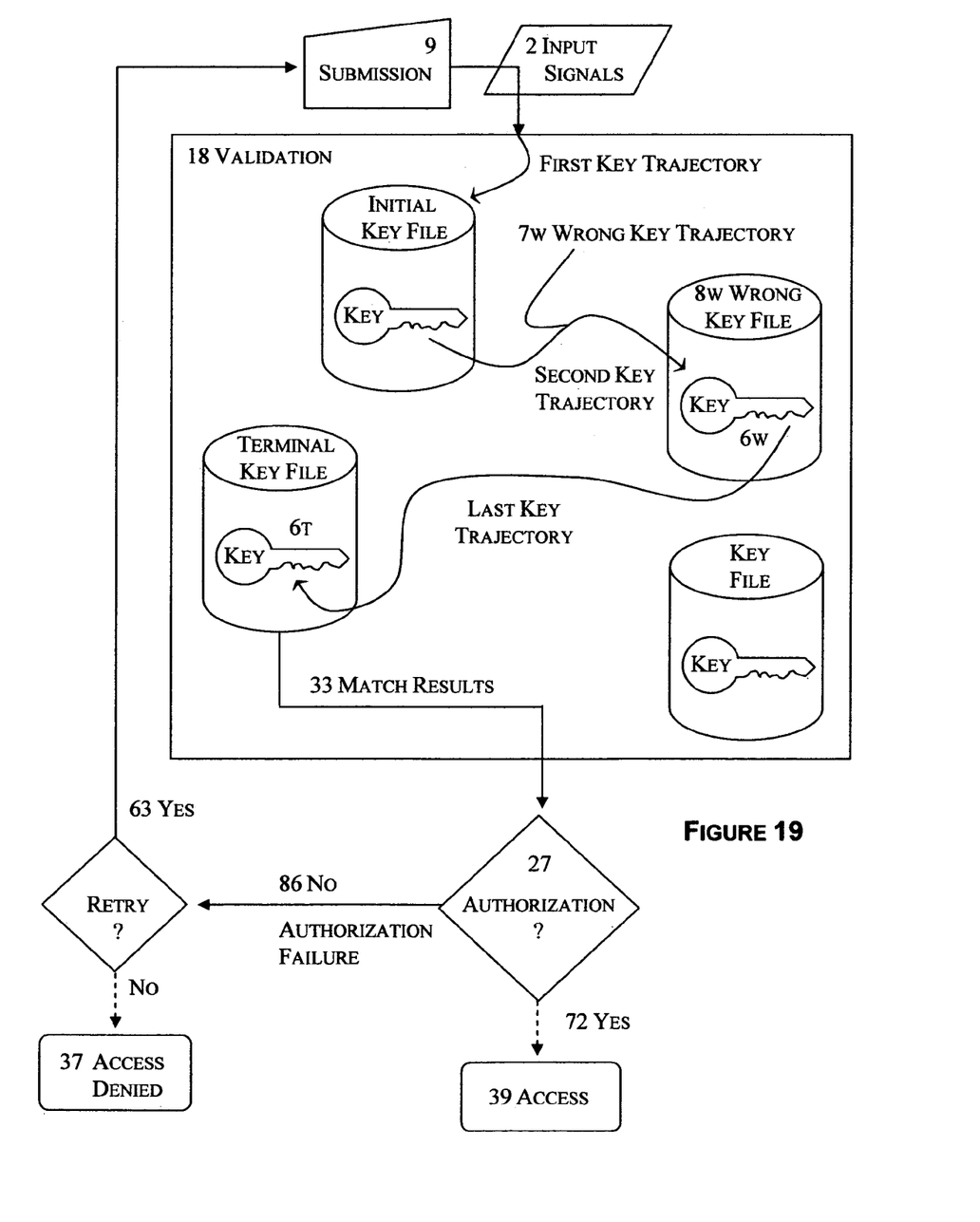
FIG. 19 depicts an example of validation key trajectory resulting in authorization failure.

FIGS. 18 & 19 depict examples of the access authentication 97 process. FIGS. 18 & 19 illustrate an example of one-to-one correspondence between signal match 5 and key 6. Through access to one or more keys 6 which may reside in one or more key files 8, validation 18 produces signal match results 33, upon which authorization 27 permits access 29, allows retry 28 of submission 9, or denies access 37.

Full submission 9 comprises a set of signals 2 upon which access 39 may be granted 72. Incomplete submission 9 comprises a set of signals 2 to which additional user input is ongoing 88, and for which by themselves 2 authorization 27 would not succeed 86.

In an example depicted by FIG. 18, the first trajectory 71 is to a key 61 in a key file 81 determined by signal type 21. Keep in mind that this process may be repeated for all possible initial keys 61. For example, consider key 108 transmission 1 input 2, with two possible corresponding signals 2: key (character) codes 210, and timing of key strokes (rhythm) 211. As an example, a key unit 16 of key code signal type 21 might be accessed to search keys 6 for signal matches 5 of key code 210 signals 2. It may be, for example, that user-selected signal selection was employed, with initial key code 210 signals 2 for the first input to be ignored, and key rhythm 211 used. A key code 210 match 5 may be found, but it would be wrong in this example, though with incremental signal matching 5, this would not be known at first. A key unit 8 of key rhythm 211 signal types 21 would also find a match 5 after the second key code (as rhythm is the timing between successive keystrokes), this time (in this example) for the correct user. In this example, the key 6 with rhythm 211 signal match 5 may have sequence packaging 15 indicating that key code 210 is ignored for this transmission 1. So, in this example of incremental validation 181, initial signal input 2 has multiple signal matches 5, narrowing possibilities in the initial transmission 1 to two possible accounts meriting validation 18 consideration. In this example, subsequent input signals 2 narrow validation 18 to a single account by a sequential process of elimination.

So, with incremental validation 181 there may need to be a plurality of input signals 2 before signal match 5 may effectively commence. In the example above, where key rhythm 211 is the first signal 2 to be matched 5, two key code 210 signals 2 must be input before key rhythm 211 may even be considered.

In the example of FIG. 18, validation 18 accesses three key files 8 through successive key trajectories 7, bundling match results 33 for authorization 27. In the depicted example, input signals 2 are validated 18 in input order interactively with input 2. In other words, validation 18 is incrementally contemporaneous 88 with submission 9. In an alternate embodiment with alternate sequencing 15, input signal 2 validation 18 may not commence until submission 9 is completed 46. The described example facilitates rapid authorization 27 by incremental validation 18. Actually, while access 39 may marginally be accelerated by incremental validation 18, only lack is authorization 86 is notably rapidly facilitated, as continued input 2 of a submission 9 that cannot possibly be validated 18 may be interrupted so that a user may retry 63.

FIG. 19 depicts an example of an embodiment employing a wrong trajectory protocol 7w. Wrong trajectory protocol 7w is employed as a means of obfuscation targeted at computer monitoring devices. In the depicted example, keys 6 are constructed with multiple key trajectories 7, with at least one trajectory to a succeeding key 6 whereupon authorization 27 may succeed 72, and at least one trajectory 7w whereupon access 39 is hopeless (fake keys 6w). In the example, signal match 77 in the initial key 77 in the initial key file 81 mismatches. In this case, key trajectory 7w leads to a fake key 6w that cannot result in successful authorization 86: whatever key 6 or key file 8 pinball is used, authorization fails 86.

Trajectories 7 may be selected non-deterministically. This suggestion is most effective when there are multiple possible trajectories 7, including wrong key trajectories 7w, that augur either for authorization success 72 or failure 86.

For example, a key 6 may contain six next key trajectories 7, three of which are wrong key trajectories 7w. Depending upon signal match 5 results, one of the three right or wrong trajectories 7 are non-deterministically chosen. This example presupposes sequences of keys 6 strung together by next key trajectories 7 that play out to authorization 27. It is possible for different next key trajectories 7 to diverge to different (possibly duplicate) keys 6 that later converge back to the same key 6.

As described, validation protocols 18 may vary, and different protocols may be combined. Multiple non-deterministic trajectory 7 paths, including wrong trajectory 7w, is one example. In some embodiments, validation protocol 18 authorizing 27 access 39 may use different trajectories 7. Duplicate signal matches 5 in different keys 6 in the same or different key files 8 may be employed to have various paths to authorization 27. As another suggestion, different signal sequencing 15 may be employed to differ trajectories 7.

The invention claimed is:

1. A computer-implemented method for creating a signature for subsequent authentication comprising:

indicating to a user commencement of signature input recording;

recording user input signals by type from at least one user-selected device among a plurality of selectable user input devices, wherein a signal comprises a set of related software-recognizable data of the same type received from at least one input device, and wherein at least one user-selectable input device affords recording a plurality of signal types, and wherein a signal type comprises a category, among a plurality of possible categories, of measurable variable input associated with at least one user-selectable input device;

terminating said recording;

creating a signature based at least in part upon said recording; and storing said signature.

2. The method according to claim 1, wherein said recording comprises signals from a plurality of user-selected devices.

3. The method according to claim 1, further comprising receiving user selection of at least one signal type from a plurality of signal types associated with at least one user input device.

4. The method according to claim 1, further comprising passively terminating authentication comparison of a subsequent signature submission to said recording,
thereby authenticating said subsequent signature; and
wherein said signature comprises at least in part signal input that is user-controllable in duration.

5. The method according to claim 1, further comprising:
comparing a subsequent signature submission to said recording,
and accepting said comparison within a predetermined degree of inexactness,
thereby authenticating said subsequent signature.

6. The method according to claim 5, wherein said predetermined degree comprises a user-designated tolerance.

7. The method according to claim 1, further comprising presenting at least a portion of said recording to said user for editing,
wherein said recording does not entirely comprise text-character codes.

8. The method according to claim 1, further comprising editing said recording,
wherein said signature is not entirely comprised of text-character codes.

9. A computer-implemented method for creating a signature for subsequent authentication comprising:
receiving user selection of at least one signal type among a plurality of selectable signal types;
recording input data of at least one signal type from at least one user-selected input device among a plurality of selectable user input devices,
wherein a signal type comprises a category, among a plurality of possible categories, of measurable variable input associated with at least one user-selectable input device,
and wherein at least one user-selectable input device affords recording a plurality of signal types; and
creating a signature comprising at least in part at least a portion of said input data of said user-selected signal types; and
storing said signature.

10. The method according to claim 9, wherein said recording comprises a plurality of user-selected devices.

11. The method according to claim 9, such that said recording precedes said receiving signal type selection.

12. The method according to claim 9, wherein at least one said signal type comprises input from a plurality of devices.

13. The method according to claim 9, further comprising:
comparing a subsequent signature submission to said recording,
and accepting said comparison within a designated tolerance of inexactness,
thereby authenticating said subsequent signature.

14. The method according to claim 9, further comprising editing said recording,
wherein said signature is not entirely comprised of text-character codes.

15. The method according to claim 9, wherein said recording comprises a plurality of user-selected signal types.

16. A computer-implemented method for incrementally authenticating a signature while receiving user input comprising:
receiving a first portion of user input data;
accumulating keys based upon matching correspondingly key data to said first portion of user input data,
wherein a key comprises at least in part a portion of a previously stored signature,
wherein said signature divisible into portions,
wherein said keys associating portions sequentially either integrally or by reference;
subsequently, iteratively receiving a plurality of portions of user input data and performing a corresponding authentication step for each portion,
wherein, upon receiving each subsequent portion after said first portion, discarding from further processing previously accumulated keys based upon failure in matching respective key data to said user input data portion; and
whereby continuing said iterative process until completing authentication by matching said last key to corresponding said user input data portion, or by process of elimination determining authentication impossible.

17. The method according to claim 16, wherein accepting said match within a designated tolerance of inexactness.

18. The method according to claim 16, wherein accessing at least one key by reference from another key.

19. The method according to claim 16, wherein said first portion comprises input from a plurality of devices.

20. A computer-implemented method for storing the signatures of a plurality of users comprising:
recording a plurality of signatures comprising data of a plurality of transmission types and signal types,
wherein a transmission type comprises indicia of a user-selected input device among a plurality of user-selectable devices,
wherein a signal type comprises a category, among a plurality of possible categories, of measurable variable input associated with at least one user input device, and
wherein at least two signals types are associated with at least one single input device; and
partitioning said signature data by transmission type and by signal type.

21. The method according to claim 20, further comprising storing a signature at least in part by partitioning said signature into portions by signal type,
such that at least one portion references another portion of said signature.

22. A computer-implemented method for creating a signature comprising:
recording user input of a plurality of signal types from at least one user-selected device among a plurality of user-selectable devices,
wherein a signal type comprises a category, among a plurality of possible categories, of measurable variable input associated with at least one user input device;
receiving user selection among those signal types recorded,
whereby receiving user selection of at least one less signal type than recorded for said device;
creating a signature comprising at least in part said user-selected signal types.

23. The method according to claim 22, further comprising receiving user indication to edit said signature,
wherein said signature is not entirely comprised of text-character codes.

* * * * *